J. L. HOLMING.
SELF LUBRICATING BALL BEARING FOR SPINDLES OF SPINNING MACHINES OR THE LIKE.
APPLICATION FILED NOV. 24, 1913.
1,195,816.                                  Patented Aug. 22, 1916.
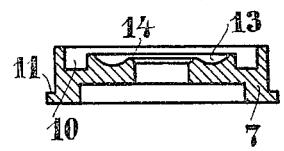
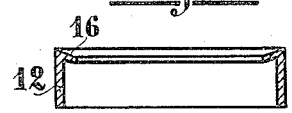
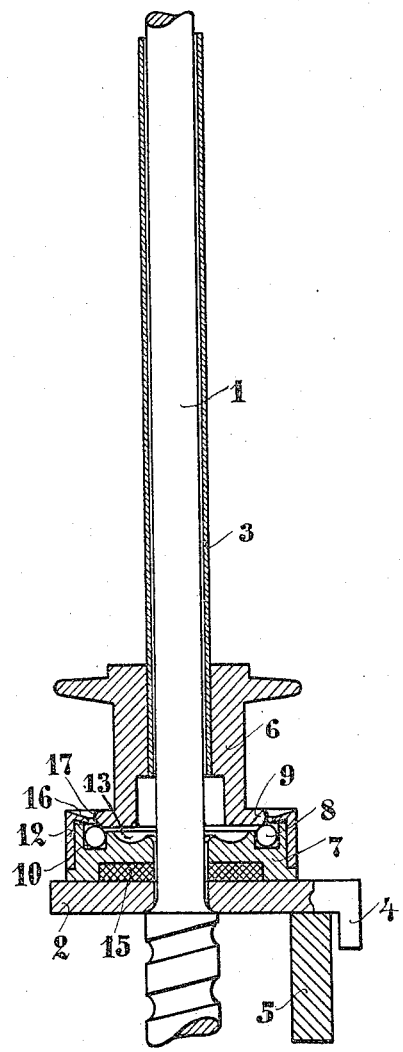
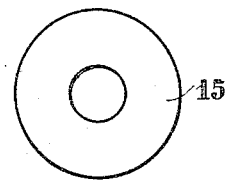

UNITED STATES PATENT OFFICE.

JOHAN LUDVIG HOLMING, OF GOTTENBORG, SWEDEN.

SELF-LUBRICATING BALL-BEARING FOR SPINDLES OF SPINNING-MACHINES OR THE LIKE.

1,195,816.  Specification of Letters Patent.  Patented Aug. 22, 1916.

Application filed November 24, 1913. Serial No. 802,816.

*To all whom it may concern:*

Be it known that I, JOHAN LUDVIG HOLMING, managing director, a citizen of Sweden, residing at Gottenborg, in the county of Gottenborg and Bohus and Kingdom of Sweden, have invented new and useful Improvements in Self-Lubricating Ball-Bearings for Spindles of Spinning-Machines or the like, of which the following is a specification.

My present invention relates to bearings such as are designed particularly for cap spindles in cap spinning machines; and it consists in the peculiar and advantageous bearing hereinafter described and definitely claimed.

In the accompanying drawing which is hereby made a part hereof: Figure 1 is a view, partly in elevation and partly in vertical section, illustrative of my novel bearing. Fig. 2 is a diametrical section of the base member of the bearing. Fig. 3 is a similar view of the cap. Fig. 4 is a detail plan view of the fibrous washer 15.

Similar numerals designate corresponding parts in all of the views of the drawings, referring to which:

1 is a fixed or non-rotating spindle that extends through and above the rail 2 which rail is provided with a finger 4, and is disposed on a vertically movable lifting device 5, designed and adapted to raise and lower the rail 2 in conventional manner.

3 is a tube or bobbin revoluble about the spindle 1, and provided with a whirl 6 on which is a base flange 9.

Arranged on the rail 2 and having a central aperture through which the spindle 1 extends is the base member 7 of my novel bearing. This member 7 is provided in its upper side with an annular ball race 10, the outer wall of which is higher than the inner wall in about the proportion illustrated, for a purpose hereinafter set forth. Between the race 10, which is designed to receive a plurality of balls 8 and the central aperture of the member 7, the said member 7 is provided in its upper side with an annular groove 13, the inner wall 14 if which is lower than the outer wall thereof, as shown in Fig. 2. In the under side of the member 7, a recess is provided to receive the fibrous washer 15, which rests on the rail 2 and surrounds the spindle 1.

Surrounding the member 7 and resting on a flange 11 thereof, is an annular cap 12. The said cap 12 is provided at 16 with an inwardly and downwardly inclined annular flange, the inner edge of which is separated from the edge of the whirl flange 9 by a narrow intervening space, indicated by 17.

In the practical operation of my novel bearing, when the whirl 6 is rotated at a high rate of speed, the flange 9 serves to throw lubricant in a direction away from the groove 10. Such lubricant strikes the underside of the flange 16, and the inclination of the said flange causes the lubricant to be thrown back toward the spindle 1. A portion of the lubricant passes downwardly on the spindle 1 and thereby lubricates the same, while the remainder of the lubricant occupies the groove 13 in the base member 7. Because of the comparatively low inner wall of the groove 13, and the motion of the parts, the lubricant that gathers in the groove 13 passes over the wall 14, and downwardly in the aperture of the member 7. From this it follows that the groove 13 assures the supply of an adequate quantity of fresh lubricant to the spindle 1 and the wall of the aperture in the member 7. Excess lubricant is taken up by the washer 15, and hence the said washer serves to lubricate the spindle 1, and at the same time prevents the dripping of lubricant on parts below the bearing.

The chief novelty of my novel bearing resides in the circular groove 13 and the low inner wall 14 of said groove, which provision allows the lubricant as it accumulates in the groove to overflow to the central boring for the vertical spindle; also, in the inwardly inclined flange 16 of the cap 12 which facilitates the accumulation of lubricant in the groove 13 when the lubricant is thrown by centrifugal action, toward said flange.

The arrangement of the inner edge of the cap flange 16 in close proximity to the perimeter of the whirl flange 9 practically prevents oil or lubricant from escaping upwardly from the bearing.

Having described my invention, what I claim and desire to secure by Letters-Patent, is:

In a bearing, an annular base member having a vertical aperture and also having in its upper side a circular groove, said groove surrounding said aperture and provided with an inner wall lower than its outer wall, whereby lubricant is enabled to freely pass from the groove to the aperture, an annular cap arranged on the base member and bearing an inwardly and downwardly inclined annular flange adapted to facilitate the passage of lubricant to said groove, and a whirl arranged above the base member with its lower portion within the flange on the cap.

In testimony whereof I have hereunto set my hand in presence of two subscribing witnesses.

JOHAN LUDVIG HOLMING.

Witnesses:
 SVEN PETTERSSON,
 FRANK SKANTZE.

Copies of this patent may be obtained for five cents each, by addressing the "Commissioner of Patents, Washington, D. C."